(12) United States Patent
Shah et al.

(10) Patent No.: US 8,524,802 B2
(45) Date of Patent: Sep. 3, 2013

(54) INK COMPOSITION AND A BALL POINT PEN COMPRISING THE SAME

(76) Inventors: Manish Babulal Shah, Maharashtra (IN); Manish Swetal Shah, Maharashtra (IN); Vinod Chintamani Malshe, Maharashtra (IN)

(*) Notice: Subject to any disclaimer, the term of this patent is extended or adjusted under 35 U.S.C. 154(b) by 97 days.

(21) Appl. No.: 13/127,963

(22) PCT Filed: Jan. 6, 2009

(86) PCT No.: PCT/IN2009/000020
§ 371 (c)(1),
(2), (4) Date: May 5, 2011

(87) PCT Pub. No.: WO2010/052729
PCT Pub. Date: May 14, 2010

(65) Prior Publication Data
US 2011/0218282 A1 Sep. 8, 2011

(30) Foreign Application Priority Data
Nov. 7, 2008 (IN) .......................... 2373/MUM/2008

(51) Int. Cl.
*C09D 11/18* (2006.01)
(52) U.S. Cl.
USPC ........... 523/161; 524/186; 524/251; 524/252; 524/366; 524/375; 524/376; 524/386; 524/388; 524/401
(58) Field of Classification Search
USPC ............... 523/161; 524/186, 251, 252, 366, 524/375, 376, 386, 388, 401
See application file for complete search history.

(56) References Cited

U.S. PATENT DOCUMENTS

| 3,425,779 | A | 2/1969 | Fisher |
| 5,942,027 | A | 8/1999 | Ikai |
| 6,530,708 | B2 | 3/2003 | Ichikawa |
| 7,303,350 | B2 * | 12/2007 | Morita et al. ................. 401/190 |
| 2005/0096410 | A1 | 5/2005 | Hattori |

FOREIGN PATENT DOCUMENTS

| EP | 0587291 | 3/1994 |
| EP | 1277813 | 1/2003 |
| GB | 2094820 | 9/1982 |
| JP | 2003191680 | 7/2003 |

OTHER PUBLICATIONS

International Search Report for International Application No. PCT/IN2009/000020 mailed Oct. 15, 2009.

\* cited by examiner

*Primary Examiner* — Vu A Nguyen
(74) *Attorney, Agent, or Firm* — Pearl Cohen Zedek Latzer, LLP

(57) ABSTRACT

A ball point pen ink composition having viscosity of at least 500 cps at 25° C. comprising 5-25% of slow evaporating organic solvent, 20-55% fast evaporating solvent, 16 to 36% of resin, 0.1 to 2% of structural viscosity imparting agent, 0.05 to 1% of polyvinyl pyrrolidone, 0.1 to 25% of lubricant, 3-25% of colorant, and 0.01 to 3% of amines/polyamines and/or 0.1 to 20% diols or polyols as associative thickening agents/additives; amines and/or diols or polyols capable of forming temporary bridging between silica particles at the same time forming associative coupling between amines itself and diols or polyol itself to obtain the ink composition having ultra low viscosity of about at least 500 cps and yet preventing leakage. The ink composition prevents leakage, bobbling and other defects associated with the prior art and at the same time gives pleasure while writing. The pen comprising, the above ink, is manufactured by the process of the invention.

17 Claims, No Drawings

INK COMPOSITION AND A BALL POINT PEN COMPRISING THE SAME

CROSS-REFERENCE TO RELATED APPLICATIONS

This application is a National Phase Application of PCT International Patent Application No. PCT/IN2009/000020, International Filing Date Jan. 6, 2009, which claims priority under 35 USC §119(e) of Indian Patent Application No. 2373/MUM/2008, filed on Nov. 7, 2008, the contents of which are hereby incorporated by reference.

TECHNICAL FIELD

This invention relates to ball point pen ink compositions having ultra low viscosity of at least 500 cps preventing leakage due to formation of temporary bridging between functional groups and associative thickening.

This invention also relates to a process for the preparation of ultra low viscosity ball point pen ink composition of the invention.

This invention also relates to a ball point pen having high lay down tips comprising the above mentioned ink prepared according to the process of the invention which prevents leakage, bobbling, gooping, gobbling and gives pleasure in writing being smooth feel even with smaller ball dia tips.

PRIOR ART OF THE INVENTION

A ballpoint pen is a writing instrument which features a tip that is automatically refreshed with ink. It consists of a precisely formed metal ball seated in a socket below a reservoir of ink. As the pen is moved along a writing surface, ink is delivered.

A conventionally known oil-based ink for such a ballpoint pen contains coloring agent, organic solvent, resin or the like, and its ink viscosity is in a range of 10000 to 30000 mPa·s at 20° C. When the ink viscosity is high in the oil-based ballpoint pen, the ball rotational resistance itself at writing becomes large and the ink condition is very heavy, which is not favorable. On the contrary, when the ink viscosity is excessively lowered, the inconveniences like ink spill-out and the degradation of handwriting dryness occur. The earlier pens leaked or clogged due to improper viscosity of the ink, and depended on gravity of ink delivery to the ball. Depending upon the gravity, it caused difficulties with the flow and that it was required that the pen to be held nearly in vertical position.

Further the use of high viscosity ink increases the ball rotation resistance during writing and it affects writing smoothness and fails to be satisfactory. Further, a high writing pressure is required during writing. In some cases, a load of 500 gf or more is applied to a pen point. The heavy load causes a pen point to be damaged instantly. Furthermore, ball breakage and writing defects frequently occur as a consequence.

The low viscosity inks provide for a much smoother writing action and a more intense written line than the high viscosity inks. When using low viscosity inks, however, special provisions must be made to prevent leakage of the ink and/or to properly control the flow of ink during writing. A generally preferred form of inexpensive pens for this purpose utilizes a so called vacuum reservoir for the liquid ink in conjunction with a capillary collector that enables ink to be fed to the writing tip and also enables the reservoir to "breathe" in response to the consumption of ink and/or to changes in temperature and pressure.

One of the writing defects is Blobbing that is a phenomenon in which a surplus ink during writing is accumulated in a pen point. Another defect is "Feathering" which is blurring of the ink due to absorption by paper etc.

There are various Japanese Patent Application laid-open nos. JP 6-313143 (1994), JP 6-313144 (1994), JP 7-196972 (1995) and JP 9-48941 (1997) that disclose ink consisting of pseudo plasticity viscosity property in which the ink viscosity during writing is low and ink viscosity is high when writing is not performed to prevent leakage. However, the leakage is not prevented completely.

Ball point pens filled with conventional inks have a viscosity of 5000 to 20000 mPa·s at 25° C. Sometimes ink leak from the pen tips happen when the ball point pens have been irradiated directly with sunlight to have the temperatures of the pen bodies elevated, or when the ball point pens have been left turning downward for long time. Ball point pens filled with inks having a low viscosity of 1000 to 5000 mPa·s at 25° C. shows leakage from the pen tips when the ball point pens have been irradiated directly with sunlight to have the temperatures of the pen bodies elevated, or when the ball point pens have been left turning downward for long time. Increasing the drying property of inks in order to stop leaking of the inks brings about the problems of deterioration in the writing feeling, starving at the beginning of writing and reduction in the shelf life. Furthermore, ink leaking out of the pen tips of ball point pens stain hands and cloths or make it impossible to use the ball point pens in a certain case. Accordingly, it is the current situation to prevent ink from leaking by reducing clearance of tips, and thus the writing feeling tends to be deteriorated.

U.S. Pat. No. 5,942,027 discloses the ink for a ball point pen which comprises at least one or plural kinds of organic solvents, colorants and resins and fine particle silica having a primary average particle diameter of 7 to 40 nm and a specific surface area (BET method) of 50 to 380 $m^2/g$. The ink for a ball point pen comprises polyvinyl pyrrolidone as an additive. The ink for a ball point pen has a viscosity of 1000 to 5000 mPa·s at 25° C.

U.S. Pat. No. 6,530,708 discloses the ink follower composition for oil-based ballpoint pens. The ink composition comprises at least one organic solvent selected from the group consisting of a sparingly volatile organic solvent and a nonvolatile organic solvent, a gelling agent comprising inorganic fine particles, and from 10 to 60% by weight of a resin soluble in the organic solvent used. The resin is terpene-base resins and phenol-base resins. The inorganic fine particles are fine particulate silica. However, U.S. Pat. No. 3,425,779 uses colloidal silica to prepare ink composition having viscosity of 874,000 cps at 28° C. with a Number 4 cylindrical spindle at 0.3 rpm on Brookfield viscometer.

JP 2003191680 discloses a ballpoint pen with which handwriting is clear and write-ability is good without bleeding, strike through and clogging, in the ballpoint pen having a ballpoint pen tip rotate-ably supporting a writing point ball in a ball holding state and filled with an oily ink. The oily ink consists of coloring agent, organic solvent, non-Newtonian viscosity imparting agent and $C_4$ aliphatic alcohol. The non-Newtonian viscosity index is 0.4 to 0.9 and viscosity at a shearing speed of 500 $sec^{-1}$ is 500 to 5000 pas at 20° C.

Theoretically it has been conventionally known that the writing pleasure is inversely proportional to the viscosity of the ink, but with the lower viscosity inks the major problem known is that of leakage, bobbling, gooping, gobbling feathering through the paper etc.

Apart in the known arts of stopping leakage with lower viscosity inks, it has been successfully achieved by fume silica and PVP, but as the inventors observed that probably the bonds are much stronger, which in turn compromises on smoothness when it is used with smaller ball dia.

OBJECTS OF THE INVENTION

An object of the invention is to provide a ball point pen ink having ultra low viscosity of at least 500 cps which prevents leakage, bobbling, feathering and other defects associated with the prior art.

Another object of the invention is to provide the ball point pen ink having ultra low viscosity of at least 500 cps wherein compounds having functional groups (hereinafter referred to as associative thickening agent/additives) capable of forming temporary bridging between silica particles and at the same time forming associative coupling between associative thickening agent/additives thereby increasing viscosity with reducing amount of silica particles and also reducing amount of polyvinyl pyrrolidone (PVP) thus making product, the ink composition, cost-effective as associative thickening agent/additives are less expensive than that of silica particles and PVP.

Another object of the invention is to provide the ball point pen ink having ultra low viscosity of at least 500 cps wherein the associative thickening agent/additives capable of forming temporary bridging between silica particles and at the same time forming associative coupling between associative thickening agent/additives thereby forming network which breaks while writing and giving smoothness feeling.

Another object of the invention is to provide the ball point pen ink having ultra low viscosity of at least 500 cps wherein the ink has a solid content in the range of 10 to 50%; a slow evaporating solvent used is less than that of higher evaporating solvent; and colourants used should have direct solubility and are low viscosity builders.

Another object of the invention is to provide the ball point pen ink having ultra low viscosity of at least 500 cps wherein the more volatile solvents such as alcohols evaporates faster at the point of discharge of ball point pen and forming a film at the point of discharge thus prevents leakage.

Another object of the invention is to provide the ball point pen ink having ultra low viscosity of at least 500 cps wherein the ink having low viscosity as low as 500 cps being used in pen with high laydown tips wherein the ball clearance is quite high than the conventional ones and yet doesn't leak at the same time giving consistent and more smooth write-up feel.

Another object of the invention is to provide processes for the preparation of the above-mentioned ink compositions.

Another object of the invention is to provide a ball point pen comprising the ink of the invention and prepared according to the process of the above invention.

Yet another object of the invention is to provide a ball point pen with high laydown tips wherein the ball clearance is quite high than the conventional ones comprising the ink of the invention and prepared according to the process of the above invention and prevents leakage of the ink and at the same time give consistent and smooth write feel.

DETAILED DESCRIPTION

Associative thickening agent/additives referred in the specification are intended to cover amines including monoamines, diamines or polyamines or alcohols including diols, triols or polyols.

Amines referred in the specification are intended to cover monoamines, diamines or polyamines or fatty amines.

According to the invention, there is provided a ball point pen ink composition having ultra low viscosity of at least 500 cps at 25° C. with a Number 21 cylindrical spindle at 1 rpm on Brookfield viscometer;
the composition comprising:
5-25% of slow evaporating organic solvent, 20-55% fast evaporating solvent, 16 to 36% of resin, 0.1 to 2% of structural viscosity imparting agent; 0.05 to 1% of polyvinyl pyrrolidone, 0.1 to 25% of lubricant; 3-25% of colourant; and 0.01 to 3% of amines/polyamines and/or 0.1 to 20% diols or polyols as associative thickening agents/additives; amines and/or diols or polyols capable of forming temporary bridging between structural viscosity imparting agent particles at the same time forming associative coupling between amines itself and diols or polyol itself to obtain the ink composition having ultra low viscosity of about at least 500 cps and yet preventing leakage.

According to the invention, there is provided a process for the preparation of a ball point pen ink composition having ultra low viscosity of at least 500 cps with a Number 21 cylindrical spindle at 1 rpm on Brookfield viscometer;
the process comprising;
a. preparing homogenous mixture by mixing resin in fast evaporating organic solvent and/or slow evaporating organic solvent and polyvinyl pyrrolidone and heating the mixture with stirring at temperature up to 100° C.;
b. adding amines and/or diols or polyols as associative thickening agent/additives to the homogeneous mixture followed by mixing viscosity imparting agent in the above mixture to form a fine homogeneous mixture;
c. preparing a colourant solution by adding fast evaporating organic solvent and/or slow evaporating organic solvent to lubricant and a colourant with stirring;
d. adding the mixture obtained in step (b) to the colourant solution obtained in step (c) with stirring for at least 30 minutes to obtain ink composition followed by cooling to obtain the ink composition having ultra low viscosity of at least 500 cps.

According to the invention, there is provided a ball point pen with high laydown tips comprising the abovementioned ink composition having viscosity of at least 500 cps of the invention which prevents leakage, bobbling, gooping, gobbling and gives pleasure in writing being smoothly.

The slow evaporating organic solvent is selected from glycols, glycol ethers, poly ethoxylate condensates or carbitols, fatty acids or acid esters such as oleic acid or acid esters. Moreover, each of these organic solvents may be used alone, or two or more of them may be appropriately combined to use. Preferably, the slow evaporating solvent used in the ink composition is 5 to 25%. The fast evaporating organic solvent is selected from ethylene glycol, monophenyl ether, benzyl alcohol, phenoxy ethanol, propylene glycol, dipropylene glycol, 1,3-butylene glycol, hexylene glycol, ethyl carbitol, tetralin, propylene glycolmonophenyl ether, dipropylene glycol monomethyl ether, dipropylene glycol monobutyl ether, dipropylene glycol monomethyl ether acetate, tripropylene glycolmonomethyl ether or N-methyl-2-pyrrolidone. Moreover, each of these organic solvents may be used alone, or two or more of them may be appropriately combined to use. Preferably, the fast evaporating solvent used in the ink composition is 20-55%.

The total (fast and slow) organic solvent used is preferably 40 to 70% by weight of the total amount of ink composition.

The resins used are selected from ketone, phenol, bis phenol, epoxy, epoxy phenolic resins, malleic resins, hydrocarbon resins xylene resins, polyethylene oxide, rosin resins, rosin derivatives, terpene based resins, cumeron-indene resins, polyvinyl butyral, polyvinyl pyrrolidone, vinyl pyrrolidone-vinyl acetate copolymers, polymethacrylates or polyacrylic acid-polymethacrylic acid copolymers, etc.

Moreover, these resins may be used alone, or two or more of them may be appropriately combined to use. Preferably, the resin used in the above ink is Malleic or Ketonic Resin or combination thereof. The resin used is preferably 15 to 35% by weight of the total amount of ink composition.

The structural viscosity imparting agent used is selected from inorganic fine particles such as carbon black, particulate silica (different grade of Aerosil/Cabosil) or precipitated silica etc. Moreover, each of these inorganic fine (nano meter range) particles may be used alone, or two or more of them may be appropriately combined to be use. The content of structural viscosity imparting agent is preferably 0.2 to 1% by weight of the total amount of ink composition. Viscosity imparting agent is added in the form of homogeneous mixture in extremely fine particle form. The viscosity agent is homogeneously mixed in solvent selected from above list of solvents.

The lubricant used in the ink is selected from Citrates, Phthalates, Oleic acid or Phosphoric acid and esters thereof, etc. Moreover, these lubricants may be used alone, or two or more of them may be appropriately combined to use. Preferably, the lubricant is used 2 to 15% by weight of the total amount of ink composition. The colorants used in the ink composition are dyes that have been used for oil-based ball-point pens; particularly dyes used are selected from group which have direct solubility and are low viscosity builders which are selected solvent dyes and base dyes which may be cationic or anionic such as Neptune Bases Neozapon dyes, Basonyl dyes offered by BASF VALIFAST colors (trade name, Orient Chemical Industries, Ltd.), NIGROSINE EX (trade name, Orient Chemical Industries, Ltd.), Eisen Spiron dye, Eisen SOT dye (trade name, Hodogaya Chemical Co., Ltd.), Spiron Violet C-RH (trade name, Hodogaya Chemical Co., Ltd.), Spiron Yellow C-2 GH (trade name, Hodogaya Chemical Co., Ltd.), Solvent Blue 38, Solvent Blue 43, Solvent Black 46, Solvent Red 39 Offered By K. Patel & Co. etc., dye lakes, etc.). The inorganic pigments may also be used which may selected from titanium oxides, carbon black, Carbon Black MA-100 (trade name, Mitsubishi Chemical Co., Ltd.), metal powders, etc. The organic pigments may be used which are selected from azo lakes, insoluble azo pigments, chelate azo pigments, phthalocyanine pigments, perylene pigments, anthraquinone pigments, quinacridone pigments, dye lakes, nitro pigments, nitroso pigments, etc. Moreover, each of colourant described above may be used alone, or two or more of them may be appropriately combined to use. The colourant used in the ink composition is preferably 5 to 20% by weight of the total amount of ink composition. The selection of one or more colourant will be dependent upon the colour of the ink.

Polyvinyl pyrrolidone is used as an additive to prevent gooping, blobbing, blotting, bleeding, and globbing. The polyvinyl pyrrolidone used in the ink composition is 8,000 to 1,500,000 mol weight.

The amine is selected from primary, secondary and tertiary aliphatic, cycloaliphatic, or aromatic amine or polyamine or fatty amine such as butyl amine, hexyl amine, 2-ethyl hexyl amine, octyl amine, decyl amine, dodecyl amine, cetyl amine, palmityl amine, ricinolyl amine, oleyl amine, steryl amine, cyclo hexyl amine, abetyl amine, picolin, pyridine and its higher homologues; 2-amino pyridine, piperazene, ethylene diamine, diethylene tri-amine, triethylene tetra-amine; polyamines such as n-alkyl propylene diamine where alkyl group is selected from $C_2$ to $C_{24}$, etc. Moreover, these amines or polyamines may be used alone, or two or more of them may be appropriately combined to use. Preferably, the amines used in the above ink are oleyl amine, ethylene diamine or diethylene triamine.

The diols or polyols are selected from ethylene glycol, propylene glycol, di-ethylene glycol, di-propylene glycol and poly ethylene oxide derivatives, polypropylene oxide derivatives, co condensates of ethylene oxide and propylene oxide, random or block copolymers of ethylene oxide and propylene oxide ranging from 200 to 2000 molecular weights, glycerine, ethylene oxide condensates of glycerin, penta erythritol and its ethylene oxide condensates and propylene oxide condensates, random or block copolymers of polycondensation products from 2 to 200 moles, sorbitol, hexitol and its isomers, butane-1,4-diol, butane-1,2-diol, butane-1,3-diol, 2-methyl pentane-1,5-diol, hexane-1,6-diol, octane-1,8-diol, decane-1,10-diol, dodecane-1,12-diol, and the like. Moreover, these diols or polyols may be used alone, or two or more of them may be appropriately combined to use. Preferably, the diols or polyol used is preferably Carbopol.

Moreover, these polyol may be used alone, or two or more of them may be appropriately combined to use.

The amine used in the ink composition is preferably 0.1 to 2% by weight of the total amount of ink composition. The diols and/or polyols used in the ink composition is preferably 0.1-10% by weight of the total amount of ink composition.

Any suitable fast evaporating solvent is used as anti-leakage and plasticizing additive in the ink of the invention.

Preferably, the ink of the invention has a viscosity of 500 cps to 5000 cps; more preferably 1200 to 3500 cps. The ink of the invention is used in pen with high laydown tips where in the ball clearance is quite high than that the conventional ones and still prevents leak at lower viscosity at the same time giving consistent and smooth write-up feel.

The ink of the invention has less solid content and high solvent content and having viscosity of at least 500 cps. According to the invention, amines and/or diols or polyol used as associative thickening agent/additives which forms temporary bridging between silica particles and simultaneously forms associative coupling between amines and polyol to obtain network of the same. The use of associative thickening agent/additives to bond/couple silica particles reduces the amount of silica particles to <1.5% and also amount of PVP to <1%. Thus, making the process and ink composition cost-effective as amines or polyol are less expensive than that of silica particles and PVP apart at the same time also providing more smoothness as compared to conventional means of using PVP and Silica. The ink composition having viscosity of at least 500 cps by using a slow evaporating solvent less than that of higher evaporating solvent and preventing leakage, bobbling, etc which are generally problems associated with prior art. The writing pleasure of the ink also depends upon the viscosity of the ink and is inversely proportional to the viscosity. Thus, the ink compositions have advantage of smooth writing and thereby give pleasure experience while writing. Fast evaporating solvent is used in the invention as anti-leakage and plasticizing additives against the prior art where the same is generally used as a co-solvent or primary solvent for manufacturing inks. Further the ink having less viscosity; particularly 500 to 5000 cps has difficulty of stopping the leakage and long term stability but the present ink composition works well without leakage, bobbling or another defects. It is our observation that the PVP which has a multi point contact with silica and forms a stronger bonds with silica, which in turn gives a lesser smooth feeling with the smaller ball dia tips. The amines/polyamines or polyols form a comparatively weaker bond such that it although prevents the leakage, it maintains more smoothness even with smaller ball dia of tips.

The invention will be more clearly understood by reference to the following examples, which however are intended only to illustrate the invention and are not to be construed as limiting the scope of the invention.

Example 1

Blue Ink 20 gms of phenoxy ethanol was added to 10 gms of ethyl carbitol, 22 gms resin (SK 100) and 0.100 gms PVP K90. The mixture was heated up to 100° C. along with stirring to dissolve the resin. To this mixture, 2 gm of oleyl amine was added and to obtain homogeneous mixture.

0.8 gm of fume silica was mixed at high speed in 10 gms of DEG

The above two mixtures were mixed with stirring to obtain a mixture.

10 gms of phenoxy ethanol was added to 10 gms of phosphoric acid ester, 18 gms of benzyl alcohol, 8 gms of Oelic Acid, 10 gms of Solvent Blue 43 with stirring till the total dye was dissolved.

The homogeneous mixture was mixed with the dye solution with stirring for at least 30 minutes. The ink composition was allowed to cool and the viscosity measured at 25° C. at 1 rpm was about 1200 cps.

The ink composition was tested for leakage and writing smoothness and the results are tabulated in Table 1.

Comparative Example 2

Blue Ink 20 gms of phenoxy ethanol was added to 10 gms of ethyl carbitol, 22 gms resin (SK 100) and 1 gm PVP K90. The mixture was heated up to 100° C. along with stirring to dissolve the resin to obtain homogeneous mixture.

0.8 gm of fume silica was mixed at high speed in 10 gms of DEG

The above two mixtures were mixed with stirring to obtain a mixture.

10 gms of phenoxy ethanol was added to 10 gms of phosphoric acid ester, 18 gms of benzyl alcohol, 8 gms of Oelic Acid, 10 gms of Solvent Blue 43 with stirring till the total dye was dissolved.

The homogeneous mixture was mixed with the dye solution with stirring for at least 30 minutes. The ink composition was allowed to cool and the viscosity measured at 25° C. at 1 rpm was about 1200 cps.

The ink composition was tested for leakage and writing smoothness and the results are tabulated in Table 1.

Comparative Example 3

Blue Ink 20 gms of phenoxy ethanol was added to 10 gms of ethyl carbitol and 22 gms resin (SK 100). The mixture was heated up to 100° C. along with stirring to dissolve the resin to obtain homogeneous mixture.

0.8 gm of fume silica was mixed at high speed in 10 gms of DEG.

The above two mixtures were mixed with stirring to obtain a'mixture.

10 gms of phenoxy ethanol was added to 10 gms of phosphoric acid ester, 18 gms of benzyl alcohol, 8 gms of Oelic Acid, 10 gms of Solvent Blue 43 with stirring till the total dye was dissolved.

The homogeneous mixture was mixed with the dye solution with stirring for at least 30 minutes. The ink composition was allowed to cool and the viscosity measured at 25° C. at 1 rpm was about 1200 cps.

The ink composition was tested for leakage and writing smoothness and the results are tabulated in Table 1.

Comparative Example 4

Blue Ink 20 gms of phenoxy ethanol was added to 10 gms of ethyl carbitol and 22 gms resin (SK 100). The mixture was heated up to 100° C. along with stirring to dissolve the resin to obtain homogeneous mixture.

2.5 gm of fume silica was mixed at high speed in 10 gms of DEG.

The above two mixtures were mixed with stirring to obtain a mixture.

10 gms of phenoxy ethanol was added to 10 gms of phosphoric acid ester, 18 gms of benzyl alcohol, 8 gms of Oelic Acid, 10 gms of Solvent Blue 43 with stirring till the total dye was dissolved.

The homogeneous mixture was mixed with the dye solution with stirring for at least 30 minutes. The ink composition was allowed to cool and the viscosity measured at 25° C. at 1 rpm was about 1200 cps.

The ink composition was tested for leakage and writing smoothness and the results are tabulated in Table 1.

TABLE 1

Results of Examples 1 to 4 in respect of leakage and writing smoothness

| Particulars | Example 1 | Comparative Example 2 | Comparative Example 3 | Comparative Example 4 |
|---|---|---|---|---|
| Solvent | | | | |
| Phenoxy Ethanol | 30 | 30 | 30 | 30 |
| DEG | 10 | 10 | 10 | 10 |
| Benzyl Alcohol | 18 | 18 | 18 | 18 |
| Carbitol | 10 | 10 | 10 | 10 |
| Resin and Binders | | | | |
| Synthetic resin | 22 | 22 | 22 | 22 |
| Aerosil | 0.8 | 0.8 | 0.8 | 2.5 |
| PVP | 0.1 | 1 | 0 | 0 |
| Colourants | | | | |
| Solvent Blue 43 | 10 | 10 | 10 | 10 |
| Additives | | | | |
| Oelic Acid | 8 | 8 | 8 | 8 |
| Phosphoric Acid Ester | 10 | 10 | 10 | 10 |
| Oleyl Amine | 2 | 0 | 0 | 0 |
| Result | | | | |
| Leakage | ⊖ | ⊖ | X | 0 |
| Writing | ⊖ | 0 | 0 | X |

Wherein: ⊖-Excellent;
0-Moderate;
X-Bad/Poor

The inks were filled in refills with 0.7 mm NSTC tips with a ILD of 30 mg/100 mts and were tested for the Leakage and Writing Test as below.

Leakage: the refills were tested in oven with 45 Deg C. and 80% humidity for two days for the leakage and were classified as below 1) No leakage "θ"
2) Slight Leakage "0"
3) Extreme Leakage "X"

Write test: The refills were tested on a copy paper with 80 GSM by hand writing test by experts for the writing pleasure and parameters such as starting property, gooping blobbing etc. and were classified as below as gooping blobbing etc.

1) Very smooth and extremely pleasant "θ"
2) Hard and moderately pleasant "0"
3) Very Hard and unpleasant "X"

Example 5

Black Ink 20 gms of phenoxy ethanol was added to 10 gms of ethyl carbitol, 20 gms resin (SK 100) and 0.100 gms PVP K90. The mixture was heated up to 100° C. along with stirring to dissolve the resin. To this mixture, 2 gm of oleyl amine was added and to obtain homogeneous mixture.

0.8 gm of fume silica was mixed at high speed in 10 gms of DEG.

The above two mixtures were mixed with stirring to obtain a mixture.

20 gms of phenoxy ethanol was added to 2 gms of phosphoric acid ester, 18 gms of benzyl alcohol, 8 gms Oelic Acid, 15 gms of Solvent Black 46 with stirring till the total dye was dissolved.

The homogeneous mixture was mixed with the dye solution with stirring for at least 30 minutes. The ink composition was allowed to cool and the viscosity measured at 25° C. at 1 rpm was about 1600 cps.

The ink composition was tested for leakage and writing smoothness and the results are tabulated in Table 2.

Comparative Example 6

Black Ink 20 gms of phenoxy ethanol was added to 10 gms of ethyl carbitol, 20 gms resin (SK 100) and 1 gm PVP K90. The mixture was heated up to 100° C. along with stirring to dissolve the resin to obtain homogeneous mixture.

0.8 gm of fume silica was mixed at high speed in 10 gms of DEG.

The above two mixtures were mixed with stirring to obtain a mixture.

20 gms of phenoxy ethanol was added to 2 gms of phosphoric acid ester, 18 gms of benzyl alcohol, 8 gms Oelic Acid, 15 gms of Solvent Black 46 with stirring till the total dye was dissolved.

The homogeneous mixture was mixed with the dye solution with stirring for at least 30 minutes. The ink composition was allowed to cool and the viscosity measured at 25° C. at 1 rpm was about 1600 cps.

The ink composition was tested for leakage and writing smoothness and the results are tabulated in Table 2.

Comparative Example 7

Black Ink 20 gms of phenoxy ethanol was added to 10 gms of ethyl carbitol and 20 gms resin (SK 100). The mixture was heated up to 100° C. along with stirring to dissolve the resin to obtain homogeneous mixture.

0.8 gm of fume silica was mixed at high speed in 10 gms of DEG.

The above two mixtures were mixed with stirring to obtain a mixture.

20 gms of phenoxy ethanol was added to 2 gms of phosphoric acid ester, 18 gms of benzyl alcohol, 8 gms Oelic Acid, 15 gms of Solvent Black 46 with stirring till the total dye was dissolved.

The homogeneous mixture was mixed with the dye solution with stirring for at least 30 minutes. The ink composition was allowed to cool and the viscosity measured at 25° C. at 1 rpm was about 1600 cps.

The ink composition was tested for leakage and writing smoothness and the results are tabulated in Table 2.

Comparative Example 8

Black Ink 20 gms of phenoxy ethanol was added to 10 gms of ethyl carbitol and 20 gms resin (SK 100). The mixture was heated up to 100° C. along with stirring to dissolve the resin to obtain homogeneous mixture.

2.5 gm of fume silica was mixed at high speed in 10 gms of DEG.

The above two mixtures were mixed with stirring to obtain a mixture.

20 gms of phenoxy ethanol was added to 2 gms of phosphoric acid ester, 18 gms of benzyl alcohol, 8 gms Oelic Acid, 15 gms of Solvent Black 46 with stirring till the total dye was dissolved.

The homogeneous mixture was mixed with the dye solution with stirring for at least 30 minutes. The ink composition was allowed to cool and the viscosity measured at 25° C. at 1 rpm was about 1600 cps.

The ink composition was tested for leakage and writing smoothness and the results are tabulated in Table 2.

TABLE 2

Results of Examples 1 to 4 in respect of leakage and writing smoothness

| Particulars | Example 5 | Comparative Example 6 | Comparative Example 7 | Comparative Example 8 |
|---|---|---|---|---|
| Solvent | | | | |
| Phenoxy Ethanol | 40 | 40 | 40 | 40 |
| DEG | 10 | 10 | 10 | 10 |
| Benzyl Alcohol | 18 | 10 | 10 | 10 |
| Carbitol | 10 | 10 | 10 | 10 |
| Resin and Binders | | | | |
| Synthetic resin | 20 | 20 | 20 | 20 |
| Aerosil | 0.8 | 0.8 | 0.8 | 2.5 |
| PVP | 0.1 | 1 | 0 | 0 |
| Colourants | | | | |
| Solvent Black 46 | 15 | 15 | 15 | 15 |

TABLE 2-continued

Results of Examples 1 to 4 in respect of leakage and writing smoothness

| Particulars | Example 5 | Comparative Example 6 | Comparative Example 7 | Comparative Example 8 |
|---|---|---|---|---|
| Additives | | | | |
| Oelic Acid | 8 | 8 | 8 | 8 |
| Phosphoric Acid Ester | 2 | 2 | 2 | 2 |
| Oleyl Amine | 1.5 | 0 | 0 | 0 |
| Result | | | | |
| Leakage | ⊖ | θ | X | 0 |
| Writing | ⊖ | 0 | 0 | X |

Wherein: ⊖-Excellent;
0-Moderate;
X-Bad/Poor

The inks were filled in refills with 0.7 mm NSTC tips with a ILD of 30 mg/100 mts and were tested for the Leakage and Writing Test as below.

Leakage: the refills were tested in oven with 45 Deg C. and 80% humidity for two days for the leakage and were classified as below
1) No leakage "θ"
2) Slight Leakage "0"
3) Extreme Leakage "X"

Write test: The refills were tested on a copy paper with 80 GSM by hand writing test by experts for the writing pleasure and parameters such as starting property, gouping blobbing etc. and were classified as below as gouping blobbing etc.
1) Very smooth and extremely pleasant "θ"
2) Hard and moderately pleasant "0"
3) Very Hard and unpleasant "X"

We claim:

1. A ball point pen ink composition having viscosity of 500-5000 cps at 25° C., the composition comprising:
    5-25 wt % of a first solvent and 20-55 wt % of a second solvent, wherein the first solvent evaporates more slowly than the second solvent;
    16-36 wt % of a resin;
    0.1-2 wt % of a structural viscosity imparting agent;
    0.05-1 wt % of polyvinyl pyrrolidone;
    0.1-25 wt % of a lubricant;
    3-25 wt % of a colorant; and
    associative thickening agents/additives comprising:
        0.01-3 wt % of an amine or polyamine; and/or
        0.1-20 wt % of a diol or polyol;
        wherein said associative thickening agents/additives form temporary bridges with the structural viscosity imparting agent while also, at the same time, forming associative coupling with said associative thickening agents/additives.

2. The ball point pen ink composition as claimed in claim 1, wherein first solvent is selected from the group consisting of glycols, glycol ethers, poly ethoxylate condensates or carbitols, fatty acids or acid esters and combinations thereof.

3. The ball point pen ink composition as claimed in claim 1, wherein the second solvent is selected from the group consisting of ethylene glycol, monophenyl ether, benzyl alcohol, phenoxy ethanol, propylene glycol, dipropylene glycol, 1,3-butylene glycol, hexylene glycol, ethyl carbitol, tetralin, propylene glycolmonophenyl ether, dipropylene glycol monomethyl ether, dipropylene glycol monobutyl ether, dipropylene glycol monomethyl ether acetate, tripropylene glycolmonomethyl ether, N-methyl-2-pyrrolidone and combinations thereof.

4. The ball point pen ink composition as claimed in claim 1, wherein the resins used are selected from the group consisting of ketone resins, phenol resins, bis phenol, epoxy, epoxy phenolic resins, maleic resins, hydrocarbon resins, xylene resins, polyethylene oxide, rosin and rosin derivative resins, terpene based resins, cumeron-indene resins, polyvinyl butyral, polyvinyl pyrrolidone, vinyl pyrrolidone-vinyl acetate copolymers, polymethacrylates, polyacrylic acid-polymethacrylic acid copolymers and combinations thereof.

5. The ball point pen ink composition as claimed in claim 1, wherein the resin used in the above ink is 15-35 wt % of the total amount of ink composition.

6. The ball point pen ink composition as claimed in claim 1, wherein the structural viscosity imparting agent comprises fine inorganic particles.

7. The ball point pen ink composition as claimed in claim 1, wherein the content of structural viscosity imparting agent is 0.2-1% by weight of the total amount of ink composition.

8. The ball point pen ink composition as claimed in claim 1, wherein the colorants used in the ink composition are selected from the group consisting of cationic or anionic Base Dyes, cationic or anionic Solvent Dyes and organic pigments, or selected from the group consisting of azo lakes, insoluble azo pigments, chelate azo pigments, phthalocyanine pigments, perylene pigments, anthraquinone pigments, quinacridone pigments, dye lakes, nitro pigments and nitroso pigments.

9. The ball point pen ink composition as claimed in claim 1, wherein the colorant is 5-20 wt % of the total amount of ink composition.

10. The ball point pen ink composition as claimed in claim 1, wherein the polyvinyl pyrrolidone used in the ink composition is a polyvinyl pyrrolidone having a molecular weight of 8,000-1,500,000.

11. The ball point pen ink composition as claimed in claim 1, wherein the amine or polyamine is selected from the group consisting of a primary, secondary and tertiary amine, an aliphatic amine, a cycloaliphatic amine, an aromatic amine, polyamines and fatty amines.

12. The ball point pen ink composition as claimed in claim 1, wherein the diol or polyol is selected from the group consisting of ethylene glycol, propylene glycol, di-ethylene glycol, di-propylene glycol and polyethylene oxide derivatives, polypropylene oxide derivatives, co-condensates of ethylene oxide and propylene oxide, copolymers of ethylene oxide and propylene oxide having molecular weights ranging from 200-2000, glycerine, ethylene oxide, condensates of glycerin, pentaerythritol and its ethylene oxide and propylene oxide condensates, sorbitol, hexitol and its isomers, butane-1,4-diol, butane-1,2-diol, butane-1,3-diol, 2-methylpentane-1,5-diol, hexane-1,6-diol, octane-1,8-diol, decane-1,10-diol, dodecane-1,12-diol, and combinations thereof.

13. The ball point pen ink composition as claimed in claim 11, wherein the amine or polyamine used in the ink composition is 0.1-2 wt % of the total amount of ink composition.

14. The ball point pen ink composition as claimed in claim 12, wherein the diol or polyol used in the ink composition is 0.1-10 wt % of the total amount of ink composition.

15. A ball point pen comprising the ink composition having viscosity of 500-5000 cps as claimed in claim 1, wherein the ball point pen comprises high laydown tips, and wherein said ink composition prevents leakage, bobbling, gooping, gobbling out of said high laydown tips, and gives pleasure in writing smoothly with said high laydown tips.

16. The ball point pen ink composition as claimed in claim 1, wherein the amine or polyamine is selected from the group consisting of butyl amine, hexyl amine, 2-ethyl hexyl amine, octyl amine, decyl amine, dodecyl amine, cetyl amine, palmityl amine, ricinolyl amine, oleyl amine, steryl amine, cyclo hexyl amine, abetyl amine, picolin, pyridine, 2-amino pyridine, piperazine, ethylene diamine, diethylene tri-amine, tri-ethylene tetra-amine, polyamines, n-alkyl propylene diamine wherein the alkyl group comprises 2-24 carbons, and combinations thereof.

17. The ball point pen ink composition as claimed in claim 6, wherein the fine inorganic particles are selected from the group consisting of carbon black, particulate silica, precipitated silica and combinations thereof.

* * * * *

UNITED STATES PATENT AND TRADEMARK OFFICE
CERTIFICATE OF CORRECTION

PATENT NO. : 8,524,802 B2  
APPLICATION NO. : 13/127963  
DATED : September 3, 2013  
INVENTOR(S) : Manish Babulal Shah et al.

Page 1 of 1

It is certified that error appears in the above-identified patent and that said Letters Patent is hereby corrected as shown below:

Inventor name: change Manish Swetal SHAH, to Swetal Manish SHAH

Signed and Sealed this  
Ninth Day of May, 2017

Michelle K. Lee  
*Director of the United States Patent and Trademark Office*